United States Patent [19]

Owers

[11] Patent Number: 4,912,331

[45] Date of Patent: Mar. 27, 1990

[54] SECURITY SENSORS

[75] Inventor: Ian A. Owers, Fife, Scotland

[73] Assignee: Racal-Guardal (Scotland) Limited, Edinburgh, Scotland

[21] Appl. No.: 320,080

[22] Filed: Mar. 6, 1989

[30] Foreign Application Priority Data

Mar. 9, 1988 [GB] United Kingdom ............... 8805540

[51] Int. Cl.⁴ .......................... G01J 5/08; G08B 13/18
[52] U.S. Cl. ..................................... 250/353; 250/342
[58] Field of Search ............................... 250/342, 353

[56] References Cited

U.S. PATENT DOCUMENTS 4,460,829  7/1984  Settani et al. ...................... 250/342

Primary Examiner—Carolyn E. Fields
Attorney, Agent, or Firm—Leydig, Voit & Mayer

[57] ABSTRACT

A system for locating zones defined by Fresnel lens segments or mirror facets of an optical arrangement in a passive infra-red security sensor uses a prism sheet which deflects light emitted by an LED mounted to the circuit board adjacent the infra-red sensitive detector so that it follows the path of infra-red radiation that would be focused onto the element of the detector without the prism sheet present.

13 Claims, 2 Drawing Sheets

SECURITY SENSORS

BACKGROUND OF THE INVENTION

1. Field of the Invention

The present invention relates to passive infra-red security sensors, and, more particularly, to a system whereby the zones of protection of such a system can be located.

2. Prior Art

One type of passive infra-red security sensor comprises an infra-red detector which is mounted behind a window defining an array of Fresnel lens segments. Each lens segment focuses infra-red radiation from a particular zone onto an infra-red sensitive element of the detector. The Fresnel lens segments may be arranged in several rows, each of which contains several segments arranged side-by-side. Such Fresnel lens arrays may be formed by moulding a suitable infra-red transmitting plastics material. U.S. Pat. No. 4,321,594 (Galvin) describes the use of such a Fresnel lens array in a passive infra-red security sensor.

Another type of sensor uses a multi-faceted or segmented mirror mounted so that each segment reflects radiation from a zone of protection onto an infra-red sensitive element. Both types of sensor may use detectors with one or more elements.

In setting up a passive infra-red security sensor, it is desirable to know the location of the zones of protection. This enables the most likely risk areas, such as doors and windows, to be adequately covered, and also allows the installer to set up the sensor so that it is not directed at zones which are most likely to be the source of false alarms. For example, where a sensor is installed in a house where a dog or cat lives, it may be desirable to ensure that no zones are so close to floor level that the animal can activate the sensor. It is also undesirable to have any heat source, which may change temperature rapidly, located in a zone of protection as this may cause false alarms.

One solution commonly used for the location of zones is the provision of a walk test lamp connected to the output of the alarm detector circuit. The walk test lamp is located on the front of the sensor itself and illuminates whenever the detector senses a fluctuation in received infra-red radiation sufficient to produce an alarm condition. Since the activation of the walk test lamp requires the installer to walk through the zones, it is not always possible to precisely locate any individual zone. The function of the walk test lamp is primarily to confirm that certain activities will generate an alarm condition.

Another solution to the problem of locating the zones is described in GB-A-No. 2 064 108 (Arrowhead). In that system a zone locater lamp is mounted close to but spaced from the infra-red detector. The Fresnel lens array is arranged such that when standing in a zone defined by a Fresnel lens segment of a first row, the zone finder lamp can be seen through a Fresnel lens segment in a second row. Such a system of zone location is effective, but places constrains on the design of the Fresnel lens array and, moreover, only allows the zones defined by the first row to be located and not those of the second row.

The present invention therefore seeks to solve the technical problem of locating the zone or zones defined by a Fresnel lens or all or any of the segments of a Fresnel lens array or a multi-faceted or single-zone mirror in a passive infra-red security sensor.

SUMMARY OF THE INVENTION

In accordance with the present invention there is provided a security sensor system comprising a passive infra-red radiation sensor defining one or more zones of protection, the sensor comprising an infra-red radiation detector and an optical arrangement including one or more optical segments by which infra-red radiation from the zone or zones of protection is directed onto the detector, and the system further comprising location means for locating one or more of the zones, the location means comprising:

a light source disposed adjacent to the detector and removable prism means for aligning the optical path of light from the light source, after the light has been directed by an optical segment of the optical arrangement, with a respective zone of protection.

The effect of the prism means is to offset the effect of the displacement of the lamp from the detector and therefore the prism means is equally effective for all segments of the optical arrangement.

Each segment of the optical arrangement may either be a Fresnel lens segment formed in or overlaid on a window of the sensor or a mirror segment of a reflecting optical system mounted on the opposite side of the detector from a window of the sensor. Therefore, the installer who wishes to find a zone defined by any of the segments of an optical arrangement merely has to move himself around in the general area until he can see the lamp through the particular segment, the zone of which he is trying to locate.

The prism means is preferably a sheet defining an array of prisms and may be moulded out of a plastics sheet material such as Perspex. A single prism could also be used. The prism means is not intended to and should not remain in position during use of the sensor and for this reason it may be made of coloured material to alert the installer to its presence.

In a preferred embodiment, the prism means is intended to be mounted in position with the cover of the sensor removed, the presence of the prism means being sufficient to prevent the cover being properly installed. In this way incorrect installation is impossible.

BRIEF DESCRIPTION OF THE DRAWINGS

A passive infra-red security sensor set up for using the zone finding system of the present invention, will now be described, by way of example only, with reference to the accompanying diagrammatic drawings in which.

DETAILED DESCRIPTION

Figure 1:
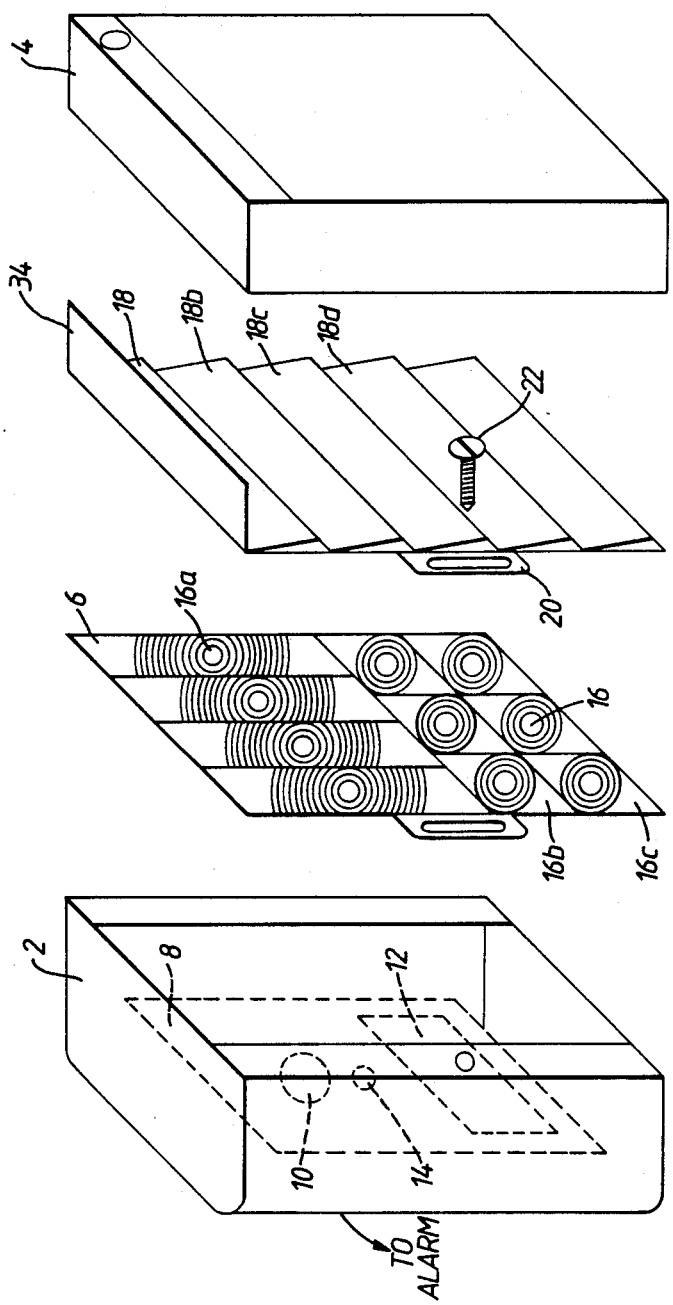
FIG. 1 is an exploded view of a passive infra-red security sensor showing the various components for use in the system of the present invention.

A passive infra-red security sensor comprises a rear housing part 2 and a front panel 4. A Fresnel lens segment array 6 is adjustably secured to the housing 2 by means of screws which engage in slots formed at either side of the array. The housing art 2 contains a circuit board 8 on which an infra-red sensitive detector 10 is mounted together with associated circuitry 12 for generating an alarm signal. Such circuitry may be of any conventional design and, not being the subject of the invention, will not be described in any greater detail herein. A lamp 14, which acts as a visible light source, is also mounted on the circuit board 8. The lamp is preferably a red LED and is displaced relative to the infra-red sensitive element or elements in the detector 10.

The Fresnel lens array is moulded into a plastics sheet 16 which may define part of the housing of the sensor. As illustrated, the array 16 consists of three rows of segments 16a, 16b and 16c.

In order to enable the zones of protection defined by the segments of the Fresnel lens array 6 to be located once the sensor has been mounted in position, a prism sheet 18 is mounted in front of the sheet 16. As illustrated, the sheet 18 is a plastics sheet into which a series of prisms 18a, 18b, 18c, 18d are moulded. The sheet 18 may have slots 20 at its side edges to allow it to be mounted over the sheet 16 by screws 22 normally used for mounting sheet 16. Light emitted from the LED 14 is directed towards the Fresnel lens sheet 16. Each Fresnel lens segment normally defines a zone from which infra-red radiation will be focussed by segment 16a onto the detector 10, the zone for segment 16a is indicated by dotted lines 24. Because of the displacement of the LED 14 from the detector 10, the light beam produced after the light has passed through the same segment 16a does not parallel the path of infra-red radiation which would be focused by this same Fresnel lens segment onto the infra-red sensitive element of the detector. The effect of the prism on the beam of light is to refract the light beam from the Fresnel lens segment 16a into a path that parallels the zone 24. Of course, if the prism sheet 18 were allowed to remain in position during operation of the sensor, it would also affect the path of infra-red radiation towards the detector. However, since the prism sheet is removed during operation, it is immaterial that the path of infra-red radiation during zone location is altered.

Although the effect of the prism sheet has only been shown for one Fresnel lens segment 16a, its effect is similar for each of the other Fresnel lens segments in the sheet 16 and, therefore, the use of this prism sheet 18 allows the zones of every segment in the array to be located. Accordingly, if the installer wishes to find the zone defined by any given Fresnel lens segment, he must simply move around the area of protection until he can see the LED in focus through the Fresnel lens segment the zone of which he is trying to locate.

Figure 2:
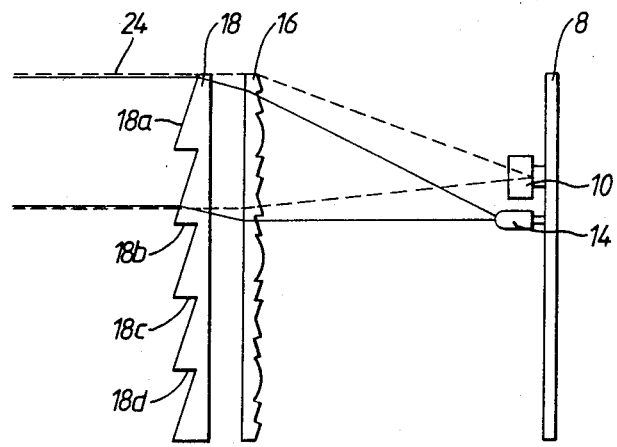
FIG. 2 is a cross-sectional view through the sensor of FIG. 1 for illustrating the optical effect of the prism sheet.
Figure 3:
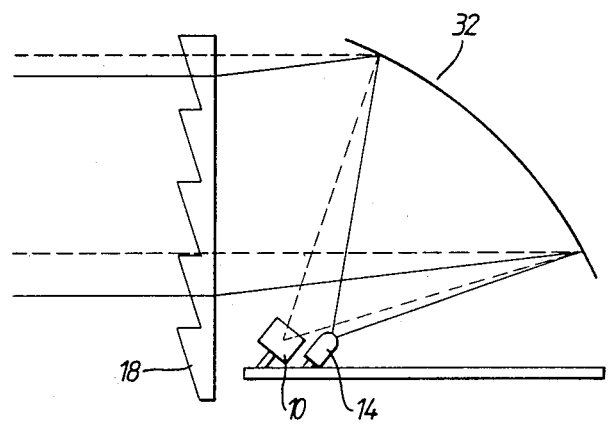
FIG. 3 is a cross-sectional view through a sensor using a reflecting optical arrangement.

The prism sheet 18 can also be used with a sensor as illustrated in FIG. 3 where the optical arrangement is a multi-faceted mirror. Each facet 32 of the mirror defines a zone of protection in a similar manner to each Fresnel lens segment in the lens sheet 16. The mirror may of course define only a single lens zone in which case it has a continuously reflecting surface rather than discrete facets. In this type of sensor the housing includes a window which is a plane infra-red transmitting window and the prism sheet 18 is mounted in front of or instead of this plane window in order to enable the installer to locate the zones. Where the window is a visible light-diffusing window it must, of course, be removed to allow the individual mirror segments to be seen by the installer for zone location. In this arrangement the prism sheet is mounted in the opposite orientation to that shown in FIG. 2 but the optical effect is the same as shown by the beam lines indicated in FIG. 3.

Instead of a sheet 18 with multiple prisms moulded into it, it would also be possible to use a large single prism.

The prism sheet must be removed when the sensor is intended to operate normally. In order to ensure that the sheet is removed, the sensor may be arranged so that the front panel 4 cannot be installed with the sheet 18 present, for example because the sheet is provided with a projection 34 at its edge which prevents the front panel seating correctly on the rear housing part 2. Alternatively, the sheet may be moulded of a coloured material so that it is obvious when it has been left in position. If the material of the sheet is infra-red opaque, then this provides another safeguard since any walk test lamp also provided on the sensor will fail to operate while the sheet is still present.

I claim:

1. A security sensor system comprising
a passive infra-red radiation sensor defining one or more zones of protection, the sensor comprising an infra-red radiation detector and optical arrangement including one or more optical segments by which infra-red radiation from the zone or zones of protection is directed onto the detector, and the system further comprising location means for locating one or more of the zones, the location means comprising
a light source disposed adjacent to the detector whereby light from the light source is directed by an optical segment or optical segments of the optical arrangement and removable prism means for aligning the optical path of light from the light source with at least one zone of protection.

2. A security sensor as claimed in claim 1, wherein said optical arrangement has more than one optical segment and the prism means aligns the optical path of light from the light source with each respective zone of protection.

3. A security sensor system as claimed in claim 1, wherein the or each optical segment of the optical arrangement is a Fresnel lens segment.

4. A security sensor system as claimed in claim 3, wherein the passive infra-red sensor has a window and the or each Fresnel lens segment is formed in or overlaid on the window.

5. A security sensor system as claimed in claim 1, wherein the or each segment of the optical arrangement comprises a mirror segment of a reflecting optical arrangement.

6. A security sensor system as claimed in claim 1, wherein the prism means comprises a sheet formed with an array of prisms, each prism corresponding to a respective optical segment of the optical arrangement.

7. A security sensor system as claimed in claim 1, wherein the prism means comprises a sheet formed with a single prism.

8. A security sensor system as claimed in claim 6 or claim 7, wherein the prism or prisms are formed as a moulding of plastics sheet material.

9. A security sensor system as claimed in claim 1, wherein the prism means is made of, or includes coloured material.

10. A security sensor system as claimed in claim 1, wherein the prism means is made of an infra-red radiation opaque material.

11. A security sensor system as claimed in claim 1, wherein the passive infra-red sensor has a removable cover, and the prism means, when positioned to align the optical path of light from the light source, prevents installation of the cover.

12. A security sensor system comprising, a passive infra-red radiation sensor defining one or more zones of protection, the sensor comprising an infra-red radiation detector and an optical arrangement including one or more optical segments by which infra-red radiation from the zone or zones of protection is directed onto the detector, and location means including a light source disposed adjacent the detector whereby light from the light source is directed by an optical segment or segments of the optical arrangement, and removable prism means for aligning the optical path of light from the light source with at least one zone of protection, the removable prism means being disposed in the optical path on the opposite side of the optical arrangement from the light source.

13. A method of locating at least one zone of protection defined by a passive infra-red radiation sensor comprising an infra-red radiation detector and an optical arrangement having one or more optical segments by which infra-red radiation from the respective zone or zones is directed onto the detector, the method comprising the steps of activating a light source disposed adjacent the detector, positioning prism means in relation to the optical arrangement so that light from the light source is aligned with at least one of the zones of protection and viewing the light aligned with the zone or zones.

* * * * *